(12) United States Patent
Lustig et al.

(10) Patent No.: US 11,909,071 B2
(45) Date of Patent: Feb. 20, 2024

(54) VEHICLE WITH A HIGH-VOLTAGE BATTERY

(71) Applicant: Bayerische Motoren Werke Aktiengesellschaft, Munich (DE)

(72) Inventors: Robert Lustig, Munich (DE); Philip Raettich, Bidingen (DE); Tobias Schmieg, Unterfoehring (DE); Frank Tenfelde, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 431 days.

(21) Appl. No.: 17/052,260

(22) PCT Filed: Jun. 7, 2019

(86) PCT No.: PCT/EP2019/064909
§ 371 (c)(1),
(2) Date: Nov. 2, 2020

(87) PCT Pub. No.: WO2019/243079
PCT Pub. Date: Dec. 26, 2019

(65) Prior Publication Data
US 2021/0091353 A1    Mar. 25, 2021

(30) Foreign Application Priority Data
Jun. 21, 2018   (DE) ..................... 10 2018 210 151.5

(51) Int. Cl.
*H01M 50/342*   (2021.01)
*H01M 10/658*   (2014.01)
(Continued)

(52) U.S. Cl.
CPC ....... *H01M 50/526* (2021.01); *H01M 10/658* (2015.04); *H01M 50/204* (2021.01);
(Continued)

(58) Field of Classification Search
None
See application file for complete search history.

(56) References Cited

U.S. PATENT DOCUMENTS 5,206,088 A * 4/1993 Raevsky .................. E04B 1/94
428/689
2003/0158314 A1   8/2003 Abu-Isa et al.
(Continued)

FOREIGN PATENT DOCUMENTS

CN   101262048 A   9/2008
CN   101523636 A   9/2009
(Continued)

OTHER PUBLICATIONS

English abstract of DE-102016100223-A1. (Year: 2017).*
(Continued)

*Primary Examiner* — Gregg Cantelmo
(74) *Attorney, Agent, or Firm* — Crowell & Moring LLP

(57) ABSTRACT

A vehicle includes a high-voltage battery which has a housing and at least one battery module arranged in the housing that has multiple battery cells which are electrically connected together via a cell contacting system. Each of the battery cells has a battery cell housing with an emergency degassing opening which opens at a specified cell inner pressure and through which hot or burning gas can be leaked out of the interior of the battery cell housing into the housing of the high-voltage battery in the event of a disruption or damage to individual battery cells. The emergency degassing openings face the cell contacting system and/or a wall of the housing of the high-voltage battery. The cell contacting system and/or the wall of the housing of the high-voltage battery is/are provided with a heat protection layer, at least in the regions in which the emergency degassing openings are arranged.

14 Claims, 1 Drawing Sheet

(51) Int. Cl.
*H01M 50/231* (2021.01)
*H01M 50/222* (2021.01)
*H01M 50/204* (2021.01)
*H01M 50/522* (2021.01)
*H01M 50/526* (2021.01)
*H01M 50/249* (2021.01)
*H01M 50/502* (2021.01)
*H01M 50/24* (2021.01)

(52) U.S. Cl.
CPC ....... *H01M 50/222* (2021.01); *H01M 50/231* (2021.01); *H01M 50/24* (2021.01); *H01M 50/249* (2021.01); *H01M 50/342* (2021.01); *H01M 50/502* (2021.01); *H01M 50/522* (2021.01); *H01M 2220/20* (2013.01)

(56) References Cited

U.S. PATENT DOCUMENTS

| | | |
|---|---|---|
| 2008/0220320 A1 | 9/2008 | Horikoshi et al. |
| 2008/0241660 A1 | 10/2008 | Ogawa et al. |
| 2011/0177366 A1 | 7/2011 | Nagasaki et al. |
| 2011/0195284 A1 | 8/2011 | Yasui et al. |
| 2011/0200856 A1 | 8/2011 | Yasui et al. |
| 2011/0274951 A1 | 11/2011 | Yasui et al. |
| 2012/0263982 A1 | 10/2012 | Yasui et al. |
| 2012/0263995 A1 | 10/2012 | Naito et al. |
| 2013/0004813 A1 | 1/2013 | Kim |
| 2013/0095355 A1 | 4/2013 | Okutani et al. |
| 2013/0095356 A1 | 4/2013 | Shimizu et al. |
| 2013/0183544 A1 | 7/2013 | Yoshioka et al. |
| 2014/0162093 A1 | 6/2014 | Reitzle et al. |
| 2014/0234677 A1 | 8/2014 | Yoon |
| 2014/0308550 A1 | 10/2014 | Shimizu et al. |
| 2014/0335378 A1 | 11/2014 | Kuroda |
| 2015/0064514 A1* | 3/2015 | Wu ............. H01M 50/293 429/120 |
| 2015/0140369 A1 | 5/2015 | Itoi et al. |
| 2016/0036088 A1 | 2/2016 | Tononishi |
| 2016/0133900 A1 | 5/2016 | Li et al. |
| 2016/0211495 A1 | 7/2016 | Haynes et al. |
| 2016/0254578 A1 | 9/2016 | Liu et al. |
| 2016/0301045 A1 | 10/2016 | Tyler et al. |
| 2016/0301051 A1 | 10/2016 | Kubota et al. |
| 2017/0084886 A1 | 3/2017 | Tononishi |
| 2017/0125753 A1 | 5/2017 | Kim et al. |
| 2017/0301968 A1 | 10/2017 | Cooney et al. |
| 2018/0138478 A1* | 5/2018 | Chan ............. H01M 50/271 |
| 2018/0248237 A1 | 8/2018 | Postler et al. |
| 2019/0259996 A1 | 8/2019 | Fritz et al. |
| 2021/0288366 A1 | 9/2021 | Brenner et al. |

FOREIGN PATENT DOCUMENTS

| | | |
|---|---|---|
| CN | 102113166 A | 6/2011 |
| CN | 102197531 A | 9/2011 |
| CN | 102246330 A | 11/2011 |
| CN | 102272981 A | 12/2011 |
| CN | 102301503 A | 12/2011 |
| CN | 202076374 U | 12/2011 |
| CN | 102473884 A | 5/2012 |
| CN | 102696131 A | 9/2012 |
| CN | 102714289 A | 10/2012 |
| CN | 102959761 A | 3/2013 |
| CN | 103081164 A | 5/2013 |
| CN | 103931020 A | 7/2014 |
| CN | 104143666 A | 11/2014 |
| CN | 105322122 A | 2/2016 |
| CN | 206059541 U | 3/2017 |
| CN | 106848130 A | 6/2017 |
| CN | 107507937 A | 12/2017 |
| CN | 207134404 U | 3/2018 |
| DE | 102008059971 A1 * | 6/2010 .......... H01M 10/613 |
| DE | 10 2012 222 876 A1 | 6/2014 |
| DE | 102013200546 A1 * | 7/2014 .......... H01M 10/658 |
| DE | 10 2015 212 212 A1 | 1/2017 |
| DE | 10 2015 216 029 A1 | 2/2017 |
| DE | 10 2015 014 558 A1 | 5/2017 |
| DE | 102016100223 A1 * | 7/2017 |
| DE | 10 2016 215 131 B3 | 12/2017 |
| DE | 10 2016 121 265 A1 | 5/2018 |
| EP | 2 077 592 A1 | 7/2009 |
| EP | 2 244 318 A2 | 10/2010 |
| EP | 2 339 672 A1 | 6/2011 |
| EP | 3 300 164 A1 | 3/2018 |
| JP | 2005-35845 A | 2/2005 |
| JP | 2008-262733 A | 10/2008 |
| JP | 2010-55957 A | 3/2010 |
| JP | 2010-205509 A | 9/2010 |
| JP | 2012-113896 A | 6/2012 |
| JP | 2013-168355 A | 8/2013 |
| JP | 2015-103346 A | 6/2015 |
| JP | 2016-96129 A | 5/2016 |
| KR | 10-2014-0104741 A | 8/2014 |
| WO | WO 2013/110406 A1 | 8/2013 |

OTHER PUBLICATIONS www.espacenet.com machine translation of DE-102008059971-A1. (Year: 2010).*

PE2E Search machine translation of DE-102016100223-A1. (Year: 2017).*

PE2E Search machine translation of DE-102013200546-A1. (Year: 2014).*

English translation of document B1 (Doc No. (JP 2012-113896 A) filed on Nov. 2, 2020) (18 pages).

English translation of document B2 (Doc No. (CN 107507937 A) filed on Nov. 2, 2020) (five (5) pages).

Chinese-language Office Action issued in Chinese Application No. 201980026925.4 dated May 7, 2022 with English translation (21 pages).

Japanese-language Office Action issued in Japanese Application No. 2020-552276 dated Mar. 22, 2022 with English translation (10 pages).

Korean-language Office Action issued in Korean Application No. 10-2020-7030341 dated Apr. 20, 2022 with English translation (13 pages).

U.S. Non-Final Office Action issued in U.S. Appl. No. 17/052,246 dated Jan. 28, 2022 (26 pages).

U.S. Final Office Action issued in U.S. Appl. No. 17/052,246 dated May 13, 2022 (16 pages).

Chinese-language Office Action issued in Chinese Application No. 201980027225.7 dated May 18, 2022 with English translation (19 pages).

Korean-language Office Action issued in Korean Application No. 10-2020-7030342 dated May 19, 2022 with English translation (13 pages).

U.S. Non-Final Office Action issued in U.S. Appl. No. 17/052,246 dated Jul. 28, 2022 (17 pages).

U.S. Final Office Action issued in U.S. Appl. No. 17/052,246 dated Jan. 5, 2023 (21 pages).

International Search Report (PCT/ISA/210) issued in PCT Application No. PCT/EP2019/061260 dated Jul. 1, 2019 with English translation (four (4) pages).

German-language Written Opinion (PCT/ISA/237) issued in PCT Application No. PCT/EP2019/061260 dated Jul. 1, 2019 (four (4) pages).

German-language Office Action issued in German Application No. 10 2018 210 152.3 dated Apr. 12, 2019 (three (3) pages).

International Search Report (PCT/ISA/210) issued in PCT Application No. PCT/EP2019/064909 dated Oct. 2, 2019 with English translation (four (4) pages).

German-language Written Opinion (PCT/ISA/237) issued in PCT Application No. PCT/EP2019/064909 dated Oct. 2, 2019 (five (5) pages).

German-language Office Action issued in German Application No. 10 2018 210 151.5 dated Nov. 4, 2019 (four (4) pages).

(56) References Cited

OTHER PUBLICATIONS

German-language Office Action issued in European Application No. 19723717.5 dated Feb. 6, 2023 (six (6) pages).
German-language Office Action issued in German Application No. 10 2018 210 152.3 dated Feb. 15, 2023 (eight (8) pages).
United States Non-Final Office Action issued in U.S. Appl. No. 17/052,246 dated Apr. 10, 2023 (20 pages).
Chinese-language Office Action issued in Chinese Application No. 201980026925.4 dated Mar. 14, 2023 with English translation (23 pages).
English translation of previously cited document B12 (JP 2010-205509 A filed on Jun. 1, 2022) (11 pages).

* cited by examiner

VEHICLE WITH A HIGH-VOLTAGE BATTERY

BACKGROUND AND SUMMARY OF THE INVENTION

The present invention relates to a vehicle having a high-voltage battery.

High-voltage batteries of electric or hybrid vehicles, such as for example the "BMW i3" vehicle, include a high-voltage battery housing having a plurality of what are known as "cell modules" (hereinafter also referred to as "battery modules") arranged therein. Each of the cell modules or battery modules consists of a plurality of battery cells arranged consecutively in series and that are electrically connected to one another. The individual battery cells are electrically connected to one another via what is known as a "cell contact system". Depending on whether the battery cells of a cell module are connected to one another in series or in parallel, like or opposite poles of the battery cells of a cell module are electrically connected to one another via the cell contact system.

The individual battery cells each have a battery cell housing. An emergency ventilation opening is provided in each of the battery cell housings. If, for example in the event of an extremely severe accident, battery cells are damaged and/or a short circuit takes place in or between individual battery cells and the interior of a battery cell heats up to an impermissibly great extent, "emergency ventilation" has to be possible for the affected battery cells. The emergency ventilation takes place through the emergency ventilation (degassing) opening, which may be designed for example as an intended breaking point that opens when a predefined internal cell pressure is exceeded and allows gas to escape from the interior of the battery cell. In extreme cases, such as for example in the case of massive damage to individual battery cells, in highly unfavorable constellations the leaking gas may ignite, wherein a leakage of flames into the surroundings or into the passenger compartment of the vehicle is very reliably avoided by virtue of the battery cells or the cell modules being arranged in a high-voltage battery housing. The high-voltage battery housing of the abovementioned "BMW i3" is a relatively rigid aluminum housing that is closed off "upwardly", that is to say in the direction toward the passenger compartment, by a screwed-on cover.

The object of the invention is to provide a vehicle having a high-voltage battery that offers even greater safety with regard to possible fire hazards in comparison with vehicles having conventional high-voltage batteries.

This object is achieved by the features of the independent claim. Advantageous refinements and developments of the invention may be derived from the dependent claims.

The starting point of the invention is the observation that, in the event of extreme mechanical damage to individual battery cells and/or short circuits internal to a cell, very hot, burning gas should be able to leak from the interior of individual battery cells into the interior of the high-voltage battery via emergency ventilation openings of the battery cell housings.

The starting point of the invention is a vehicle having a high-voltage battery that has a housing "high-voltage battery housing" and at least one cell module (hereinafter also referred to as "battery module") arranged in the housing. The cell module or battery module in turn has a plurality of battery cells electrically connected to one another via a cell contact system. The individual battery cells each have a battery cell housing having an emergency ventilation opening that opens starting from a predefined internal cell pressure. There may be provision for the cell contact system to fully or at least partly cover the emergency ventilation openings of the battery cells of the cell module in question. By virtue of the emergency ventilation openings, hot or burning gas is able to escape from the interior of the battery cell housings into the interior of the high-voltage battery housing in the event of a fault with or damage to individual battery cells. The emergency ventilation openings face the cell contact system and/or a wall of the housing.

In one aspect of the invention, the cell contact system and/or the wall of the housing of the high-voltage battery is or are provided with a heat protection layer, in particular with a heat protection coating layer, at least in those regions in which the emergency ventilation openings are arranged. A situation is thereby prevented in which hot or burning gas leaking from one or more battery cells through the emergency ventilation opening or the emergency ventilation openings impinges directly on the wall of the housing of the high-voltage battery. Hot or burning gas thus impinges initially on the heat protection layer that is provided on the cell contact system and/or on the heat protection layer that is provided in the region of the emergency ventilation openings on the inside of the wall of the housing of the high-voltage battery. Even at very high temperatures of the leaking gas (for example temperatures of more than 1000° C.), hot gas is thereby prevented, at least for a predefined duration, from burning through the wall of the housing of the high-voltage battery and leaking from the high-voltage battery housing. This contributes to a further improvement in passenger safety in electrified vehicles. A leakage of flames from the high-voltage battery housing is thus able to be prevented with even greater reliability.

Applying a heat protection layer to the cell contact system and/or the inner wall of the housing of the high-voltage battery in the region of the emergency ventilation openings is inexpensive, easily able to be applied in industry and entails only a very low additional weight.

The invention thus prevents direct impingement on the battery wall. The term "wall" of the housing of the high-voltage battery or the term "battery wall" should be understood extremely broadly. This may in principle be a lower wall, a side wall or an upper wall (for example a cover) of the housing of the high-voltage battery.

According to one development of the invention, the cell contact system is arranged between the emergency ventilation openings of the battery cells and the wall of the housing of the high-voltage battery.

According to one development of the invention, the cell contact system has an electrically conductive conductive element that is electrically connected to electrodes of a plurality of battery cells. The conductive element may be for example a conductive metal sheet (for example steel or aluminum sheet). There may be provision for the conductive element to be carried or held by a holding element. The holding element may be for example a plastic part (for example an injection-molded part). The cell contact system within the meaning of the present invention may be formed by the conductive element and/or by the holding element. The heat protection layer may accordingly be applied to the conductive element and/or to the holding element. In this case, the cell contact system acts in a manner similar to a "baffle plate" when hot or burning gas leaks from one or more battery cells, which prevents hot or burning gas from impinging directly on the material of the wall of the housing of the high-voltage battery.

According to one development of the invention, there may be provision for the heat protection layer to be an intumescent layer. Intumescent materials are known from refractory technology. If an intumescent material is exposed to a flame, the material expands significantly or swells. The volume of the intumescent material thus increases. The material thus foams or inflates and becomes porous, thereby further increasing its insulating effect and its fire-retarding effect.

According to one development of the invention, there may be provision for the heat protection layer provided on the cell contact system and/or on the wall of the housing of the high-voltage battery to be a ceramic layer or a layer that contains ceramic particles.

As already mentioned above, there may be provision for the heat protection layer to be provided only in those regions in which emergency ventilation openings are arranged, on the cell contact system and/or on the wall of the housing of the high-voltage battery. The entire cell contact system or the entire wall of the high-voltage battery housing thus does not necessarily need to be provided with such a heat protection layer. By contrast, a "local reinforcement" of the cell contact system or of the wall of the housing of the high-voltage battery with such a heat protection layer is sufficient.

By way of example, there may be provision for the heat protection layer to have a layer thickness of at least 0.1 mm.

The wall of the housing of the high-voltage battery may consist of aluminum or an aluminum sheet that is provided with a heat protection layer at least or only in the region or in those regions in which the emergency ventilation openings are arranged. By way of example, there may be provision for the emergency ventilation openings to be provided on an upper side of the battery cell housing, with respect to the direction of gravity, and for the heat protection layer to be provided on an inside or a lower side of an upper side (cover) of the housing of the high-voltage battery.

The wall of the high-voltage battery housing does not however necessarily have to consist of metal or aluminum. The wall of the high-voltage battery housing may in principle consist partly or fully of a plastic material that is provided with a heat protection layer at least in those regions in which the emergency ventilation openings of the battery cells are arranged, which heat protection layer prevents hot or burning gas from impinging on the wall in an extreme case.

As already mentioned, there may be provision for the emergency ventilation openings to be closed off in a gastight manner in the correct state of the battery cells and to open or burst open only after a predefined internal cell pressure is exceeded.

As already indicated, there may be provision for the heat protection layer to be provided on that side of the wall or of the cell contact system facing the emergency ventilation openings.

According to one development of the invention, the heat protection layer consists of a material that does not melt and not burn, or not melt and not burn for a predefined duration, at least up to a temperature of 1000° C. or 1100° C. or 1200° C. or 1300° C.

By way of example, there may be provision for the heat protection layer not to be perforated or burned by hot or burning gas that leaks from the battery cells at least for a duration of 0.5 minutes and a temperature of up to 2000° C., in particular up to a temperature of up to 1600° C.

The invention is explained in more detail below in connection with the drawings.

DETAILED DESCRIPTION OF THE DRAWINGS

Figure 1:
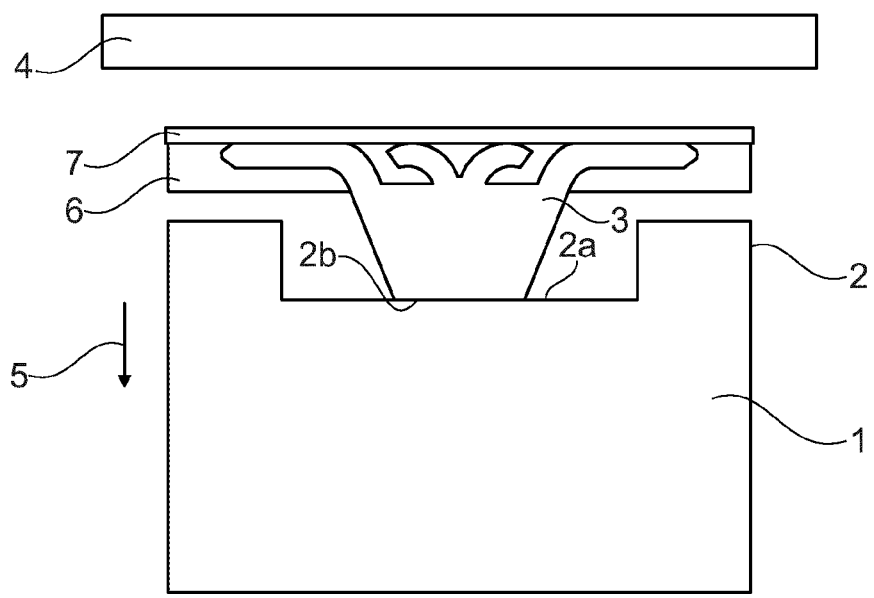
FIG. 1 is a schematic diagram of a first exemplary embodiment according to the invention in which a heat protection coating is provided on the cell contact system.

FIG. 1 shows a highly schematic illustration of a battery cell 1 that is part of a cell module (not illustrated) consisting of a plurality of such battery cells. The battery cell 1 has a battery cell housing 2. An emergency ventilation opening 2b is provided in an upper region 2a of the battery cell housing 2. In the correct state of the battery cell 1, the emergency ventilation opening 2b is closed off. The emergency ventilation opening 2b opens or breaks only when a predefined pressure in the interior of the battery cell housing 2 is exceeded. In the event of extreme mechanical damage to the battery cell housing 2 or in the event of a short circuit in the battery cell or between individual battery cells, a considerable pressure rise and the leakage of hot or burning gases through the emergency ventilation opening 2 may take place in the interior of the battery cell housing. Hot or burning gas is indicated by the reference sign 3 in FIGS. 1 and 2.

The battery cell 1 or the cell module, not illustrated in more detail here, is arranged in a housing, not illustrated in more detail here, of a high-voltage battery. Only a cover 4 of the housing of the high-voltage battery is illustrated here. The cover 4 is located in an upper region of the housing of the high-voltage battery with respect to the direction of gravity, which is indicated by an arrow 5.

A cell contact system 6, which is indicated only highly schematically here, is arranged between the cover 4 and the battery cell housing 2. Individual poles (like poles or opposite poles) of individual battery cells of a cell module are electrically connected or interconnected to one another via the cell contact system 6. In each case, the cell contact system has a conductive element, which may be formed for example by a conductive metal sheet, via which the poles of the individual battery cells of the cell module are electrically connected to one another. There may additionally be provision for the cell contact system to have a holding element that holds or carries the conductive element, which holding element may for example consist of a plastic material. In the exemplary embodiment shown in FIG. 1, a heat protection coating 7 is provided on an upper side of the cell contact system 6, for example on the holding element or a cover of the cell contact system. The heat protection coating does not necessarily have to be provided on a side facing away from the battery cell 1 or on a side facing away from the battery cells of the cell module. As an alternative or in addition, the heat protection coating may also be provided on a side of the cell contact system 6 facing the battery cell 1 or the battery cells of the cell module, that is to say on that side of the cell contact system 6 facing the emergency ventilation opening 2b.

The cell contact system 6 and in particular also the heat protection layer 7, at least for a predefined duration, prevent hot or burning gas 3 leaking from the emergency ventilation opening 2 from impinging directly on the inside or lower side of the cover 4 of the housing of the high-voltage battery.

The cell contact system 6 or the heat protection coating provided thereon or the heat protection layer 7 thus acts as a kind of baffle layer, as a result of which the risk of hot or burning gas burning through the wall of the high-voltage battery housing or through the cover 4 is significantly reduced.

Figure 2:
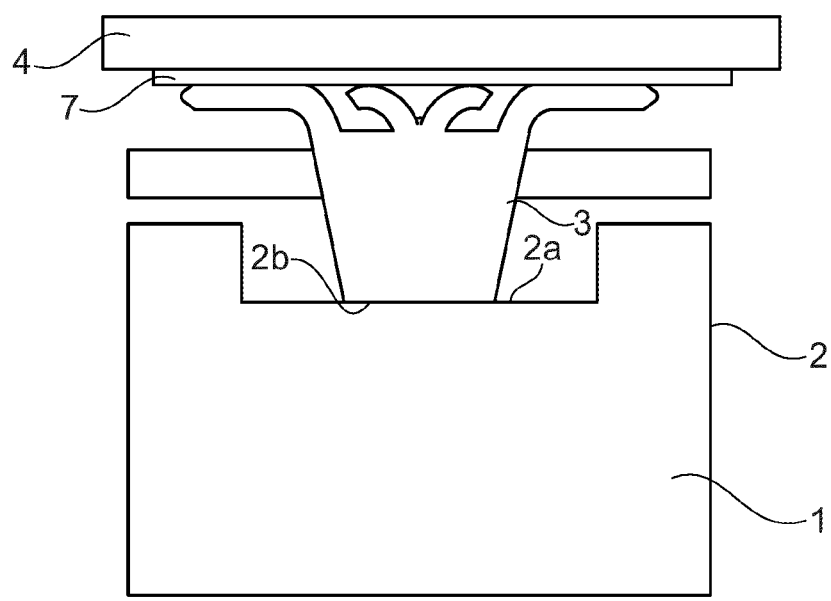
FIG. 2 is a schematic diagram of a second exemplary embodiment in which a heat protection coating is provided on an inside of a cover of the high-voltage battery housing.

In the exemplary embodiment shown in FIG. 2, the heat protection layer 7 is provided on an inside of the wall of the housing of the high-voltage battery, or here specifically on an inside or lower side of the cover 4 of the housing of the high-voltage battery.

What is claimed is:

1. A vehicle having a battery, comprising:
a housing;
a battery module arranged in the housing, the battery module having a plurality of battery cells; and
a cell contact system that electrically connects the plurality of battery cells to one another, wherein
the battery cells each have a battery cell housing with an emergency ventilation opening which opens at a predefined internal cell pressure and through which hot or burning gas is able to escape from an interior of the battery cell housing into the housing of the battery in an event of a fault with or damage to individual battery cells,
the emergency ventilation openings face the cell contact system,
the cell contact system is provided with a single heat protection layer at least in regions in which the emergency ventilation openings are arranged, and
the heat protection layer consists of a heat protection coating.

2. The vehicle according to claim 1, wherein
the cell contact system is arranged between the emergency ventilation openings and a wall of the housing of the battery.

3. The vehicle according to claim 1, wherein
the cell contact system has an electrically conductive conductive element that is electrically connected to electrodes of a plurality of battery cells and/or a holding element that carries the conductive element, and
the heat protection layer is applied to the conductive element.

4. The vehicle according to claim 1, wherein
the heat protection layer is an intumescent layer.

5. The vehicle according to claim 1, wherein
the heat protection layer is a ceramic layer or a layer containing ceramic particles.

6. The vehicle according to claim 1, wherein
the heat protection layer has a layer thickness of at least 0.1 mm.

7. The vehicle according to claim 1, wherein
the emergency ventilation openings are closed off in a gastight manner when an internal pressure of the battery cells is less than the predefined internal cell pressure.

8. The vehicle according to claim 1, wherein
the emergency ventilation openings are each formed by an intended breaking point that opens when the predefined internal cell pressure is exceeded.

9. The vehicle according to claim 1, wherein
the battery cells are arranged such that the emergency ventilation openings face an upper wall, with respect to a direction of gravity, or a cover of the battery.

10. The vehicle according to claim 1, wherein
the heat protection layer does not melt and does not burn up to a temperature of 1300° C.

11. The vehicle according to claim 1, wherein
the heat protection layer does not melt and does not burn up to a temperature of 1000° C.

12. The vehicle according to claim 1, wherein
the heat protection layer is not perforated and not burned by the hot or burning gas that leaks from the battery cells for a duration of 0.5 minutes at a temperature of up to 2000° C.

13. The vehicle according to claim 1, wherein
the heat protection layer is not perforated and not burned by the hot or burning gas that leaks from the battery cells for a duration of 0.5 minutes at a temperature of up to 1600° C.

14. The vehicle according to claim 1, wherein
the cell contact system has an electrically conductive conductive element that is electrically connected to electrodes of a plurality of battery cells and/or a holding element that carries the conductive element, and
the heat protection layer is applied to the holding element.

* * * * *